Aug. 23, 1927. A. L. RIKER Re. 16,711

CONSTANT COMPRESSION INTERNAL COMBUSTION ENGINE

Original Filed April 8, 1921 2 Sheets-Sheet 1

Inventor

*Andrew L. Riker*

By

S. H. Braddock

Attorney

Aug. 23, 1927. A. L. RIKER Re. 16,711

CONSTANT COMPRESSION INTERNAL COMBUSTION ENGINE

Original Filed April 8, 1921 2 Sheets-Sheet 2

Inventor
Andrew L. Riker

By S. H. Braddock
Attorney

Reissued Aug. 23, 1927. Re. 16,711

UNITED STATES PATENT OFFICE.

ANDREW L. RIKER, OF FAIRFIELD, CONNECTICUT.

CONSTANT-COMPRESSION INTERNAL-COMBUSTION ENGINE.

Original No. 1,533,947, dated April 14, 1925, Serial No. 459,807, filed April 8, 1921. Application for reissue filed October 13, 1925. Serial No. 62,327.

This invention relates to variable-speed and variable-load internal combustion engines, such, for example, as used on automotive vehicles. When automotive vehicles in general use today are throttled down, the suction stroke of the piston draws in less fuel-gas than when running with wide open throttle. This results in a lowered initial pressure within the cylinder at the beginning of the compression stroke and a consequent loss of efficiency and power.

The present invention has for its main object to provide an internal combustion engine wherein the pressure within a cylinder thereof at the beginning of the compression stroke of a piston in said cylinder can be constant while the amount of the intake of gaseous fuel to said cylinder is varied and definitely controlled at will.

A more specific object is to produce an internal combustion engine having means for supplying a cylinder of said engine with gaseous fuel and for controllably varying the amount of gaseous fuel supplied to correspond with a working condition prevailing at a particular time in the engine; having separate means for freely supplying said cylinder with air under all working conditions in the engine; and including an interrelation of said air supplying means and said gaseous fuel supplying means which contemplates the direct control of the feed of gaseous fuel to said cylinder and the free passage of air (which may be atmospheric air) thereto, in order that there will be sufficient air capable of passing to the cylinder during any suction stroke of the piston thereof to insure a contant pressure in said cylinder at the beginning of each compression stroke no matter what may be the working condition prevailing in the cylinder.

A further specific object is to produce an engine as stated, wherein the amount of gaseous fuel supplied to the cylinder will be fixed for a fixed working condition of the engine, and will vary for different working condition in direct ratio to the power generated; that is, the present object contemplates the supply of gaseous fuel to a cylinder in direct ratio to the power generated and in inverse ratio to the supply of air.

A further specific object is to produce an internal combustion engine having means capable of supplying a surplus of air to a cylinder under varying working conditions therein; separate means for supplying gaseous fuel to said cylinder and for controllably varying the supply of gaseous fuel to reduce at will the amount of intake of gaseous fuel to correspond with a lighter engine load; and including an interrelation between said means whereby during any suction stroke of a piston in said cylinder there will be capable of being present a sufficient amount of air to provide, together with gaseous fuel admitted, a constant pressure in said cylinder under all working conditions of the engine, whether running at full capacity or at less than full capacity.

A further specific object is to provide an internal combustion engine having an air inlet valve adapted to be maintained at fixed capacity, which capacity is capable of supplying a cylinder with a full charge of air during any suction stroke of a piston in said cylinder; and also having a gaseous fuel inlet valve and means for timing said gaseous fuel inlet valve relative to said air inlet valve, whereby the operation of said valves can be simultaneous, as when the engine is working at full capacity, or the operation of said gaseous fuel inlet valve can be retarded relatively to the operation of said air inlet valve, as when the engine is working at less than full capacity.

A further object is to provide in the engine an arrangement for segregating an explosive mixture in a cylinder in such manner that there can be (at the commencement of the work stroke of a piston in said cylinder) ignition of said explosive mixture adapted to produce proper flame propagation in said cylinder no matter what may be the working condition prevailing in the cylinder. More specifically, the present object of the invention contemplates the usual compression-end and a space or pocket communicating with said compression-end, but in effect segregated therefrom; a valve controlled air inlet into said compression-end and a valve controlled exhaust outlet from said compression-end; a separate valve controlled inlet for admitting gaseous fuel into said space or pocket; and means for timing the opening of the gaseous fuel inlet valve relative to the opening of the air inlet valve to vary the fuel inlet at will; all designed to provide in a cylinder, for any explosion therein, independently of the working condition at a particular time prevailing in an engine having said cylinder, an explosive mixture which will be confined to a segregated area in said cylinder and will be so proportioned as to produce in said cylinder for each explosion therein, proper flame propagation; that is, the flame propagation desired for a particular working condition in said cylinder. As will hereinafter fully appear, the present engine operates after the general fashion of an ordinary engine of commerce under full capacity condition, there being provision for opening the gaseous fuel valve simultaneously with the opening of the air valve when full engine capacity is reached, whereby the gaseous fuel and air (which may be atmospheric air) are drawn in simultaneously to be commingled and compressed together. When the engine is working at its lowest capacity, practically all of the gaseous fuel will be confined to the space or pocket which communicates with the compression-end of the cylinder, and the remainder of the "charge" will be pure air. When the engine is working at capacities between its full and lowest capacity, the gaseous fuel will be confined to the space or pocket to a certain extent and will mix with the air in the compression-end to a certain extent, the confinement of the gaseous fuel to the space or pocket increasing in degree as low engine capacity is approached, and the mixing of the gaseous fuel with the air increasing in degree as full engine capacity is approached. In all instances, however, whether the engine is working at full capacity, at lowest capacity, or at any capacity between its full capacity and its lowest capacity, the arrangement will be such that there will be an explosive mixture confined to a segregated area in the cylinder (adjacent an ignition means), and the improved engine is so designed that this segregated explosive mixture will be proportioned, under all working conditions in the engine, to produce proper flame propagation in the cylinder for each explosion therein.

The invention further comprises the various features hereinafter set forth and claimed, and will be best understood by reference to the annexed drawings, which illustrate a preferred embodiment of a new apparatus for carrying out the principles of the invention. But it is to be understood that the present disclosure is merely illustrative and not intended to be in any limiting sense. In these drawings:

Figure 2:
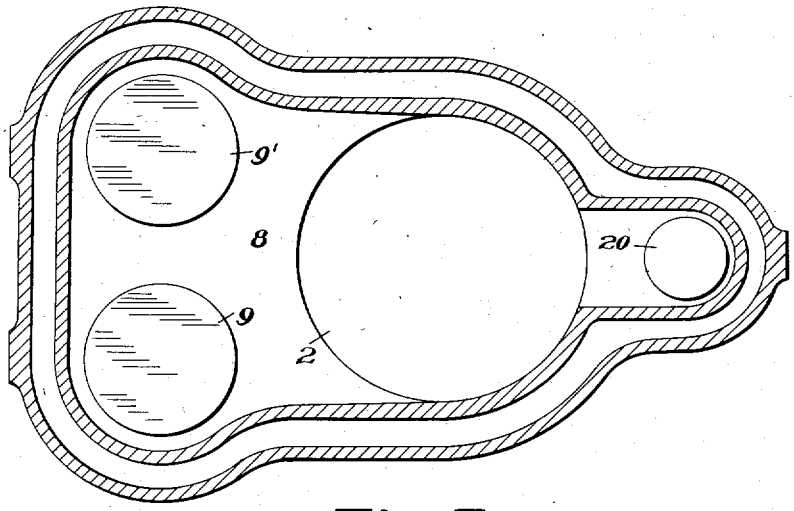
Fig. 2 is a horizontal section through the line II—II of Fig. 1.
Figure 3:
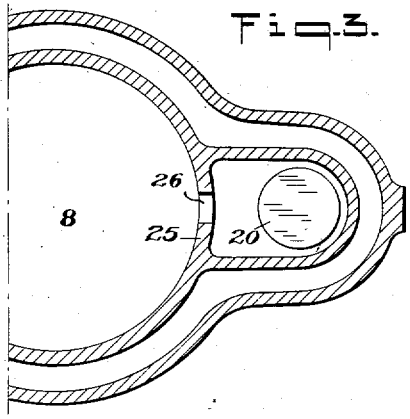
Fig. 3 is a partial horizontal section of a modification.

In the drawings, 1 represents one of the vertical cylinders of the engine, containing the piston 2 with its piston rod 3 properly connected to the crank 4 of the crank shaft 5. The cylinder may be enclosed by the usual or any preferred form of water jacket. 6 is a pipe constituting the inlet for atmospheric air, and 7 a pipe constituting the exhaust, communicating with the valve-controlled cylinder-end or compression-chamber 8 at the top of the cylinder. 9 is the valve for controlling access of air into said cylinder-end or compression-chamber. This valve is shown as provided with a valve stem 10 passing through a suitable bearing in the engine frame, and extending through the cam-shaft casing 11 into operative relation with its valve actuating cam 12 on a suitable shaft 13, which latter is rotated by any suitable connections from the crank shaft 5. As shown, said valve stem carries a collar 14 against which bears one end of a coil spring 15 that encircles said stem, while the other end of said spring bears against the frame, whereby the spring maintains said valve 9 normally in closed position. 9′ (see Fig. 2) is a similar valve for controlling the exhaust-outlet through pipe 7. This valve is mounted like valve 9, and is similarly spring-pressed and cam-actuated. 16 represents the usual or any preferred form of carburetor whence a passage 17, preferably having a throttle-valve 18, leads through a suitable opening in the engine-frame into the segregated ignition space, chamber, or pocket 19, which is located in the upper end of the engine-frame in communication with the compression chamber. 20 is a valve controlling the entrance of the fuel into said combustion-chamber; and said valve 20 is mounted and actuated in the manner disclosed for said valve 9, by its own valve-cam 21 (of a form to be described) mounted on a shaft 22 which is rotated in any convenient manner from the crank-shaft 5. Access to said valves 9, 9′ and 20 is attained by plugs as 23 and 24, whereof plug 24 is threaded to receive a spark-plug 29 of the usual or any preferred type. Preferably, the parts are so proportioned that when the piston 2 is at the top of its stroke there will remain very slight yet sufficient communication between the compression-chamber 8 and the combustion space, chamber, or pocket 19. When the piston is lowered, however, the communication between the chamber 8 and the space, chamber, or pocket 19 is entirely open (as seen from Fig. 2); but, if preferred, communication may be restricted, as shown by Fig. 3, by a partition 25 having a port 26.

Figure 1:
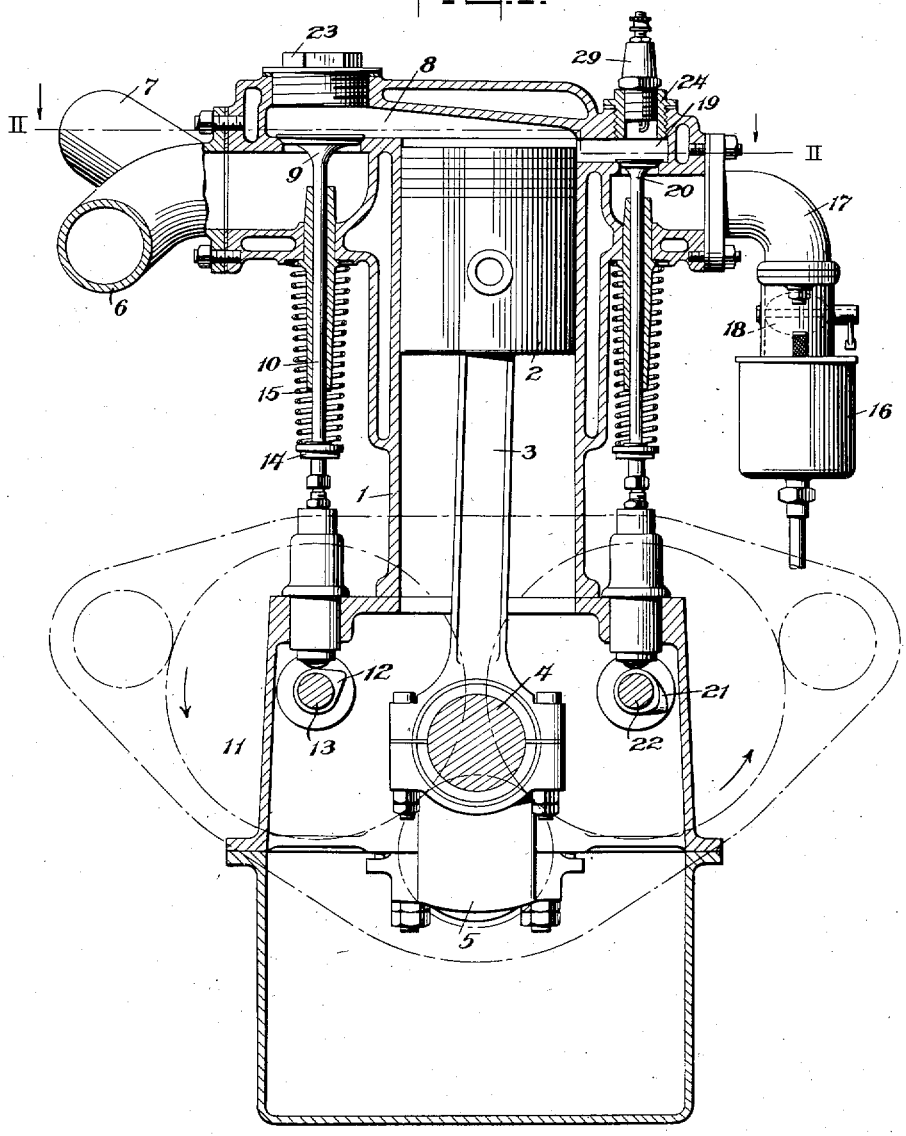
Fig. 1 is a vertical section through a convenient form of four-cycle internal combustion engine containing a preferred embodiment of the present invention, showing the moving parts in their position at the end of the exhaust stroke.
Figure 4:
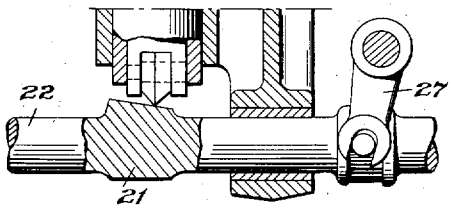
Fig. 4 is a side view, as seen from the left of Fig. 1, of a detail of the structure for actuating the timing-feature of the fuel intake.
Figure 5:
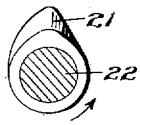
Fig. 5 is an enlarged front view of the cam for actuating the fuel-inlet valve.

The cam 12 for opening the air valve 9 and the cam for opening the exhaust valve 9′ may be of the usual or any preferred form. But the cam 21 for opening the fuel valve 20 is, as indicated by Figs. 4 and 5, of a peculiar form, which might best be described as of a staggered and somewhat conical (or ovoid) shape; that is, said cam is elongated, and at its smaller end the bulge or cam projection is of the minimum height and circumferential extent, which bulge increases in circumferential extent and in height towards the maximum at the larger end. The cam-shaft 22, which carries said staggered-ovoid cam 21, is itself longitudinally movable, as indicated in Fig. 4, to bring a more-extended or less-extended portion of the cam (as desired) into operative relation with the piston-rod of said valve 20. Such movement of said shaft 22 may be attained by means of a rocker 27 having a forked end engaging a collar on the shaft, said rocker being actuated at will by the operator, preferably being connected to the usual accelerator lever. By drawing said cam-shaft and its cam 21 forward (with respect to Fig. 1, or to the right with respect to Fig. 4), the cam action will be advanced, and the valve 20 lifted at an earlier stage and to a greater extent; whereas, by forcing said shaft 22 backwards (to the left in Fig. 4), the cam action will be retarded, and the valve 20 lifted at a later stage and to a less extent. Manipulation of the shaft 22 as by the accelerator "times" the admission of fuel to the combustion-chamber.

The operation of the engine will be obvious. Upon the intake or suction stroke of the piston, the exhaust valve 9′ being held down, the air valve 9 is opened by its cam 12 (against the spring 15) and cold air alone is drawn into the compression-end or chamber 8 of the cylinder, the combustion space, chamber, or pocket being in free communication with the cylinder; the valve 20 will be opened by its cam 21, either simultaneously with the opening of the valve 9 or at a later stage of the same suction stroke, according to the position into which the shaft 22 has been shifted, and when said valve 20 is opened, the gaseous fuel from the carburetor will be drawn into the combustion space, chamber, or pocket. When the fuel intake is retarded, as well as when the valves 20 and 9 are opened simultaneously, some of the air from the chamber 8 will enter and remain in the space, chamber, or pocket 19. When the engine is working at its lowest capacity (gaseous fuel intake retarded the maximum amount) practically all of the gaseous fuel will be confined to the space or pocket 19, and the remainder of the charge will be pure air. When the engine is working under full capacity (gaseous fuel intake simultaneous with air intake), gaseous fuel and air will be drawn in simultaneously to be commingled and compressed together to provide a practically homogeneous mixture throughout the chamber 8 and the space, chamber, or pocket 19, and the engine will operate after the general fashion of an ordinary engine of commerce. When the engine is working at capacities between its full and lowest capacity (gaseous fuel intake retarded less than the maximum amount), the gaseous fuel will be confined to the space or pocket 19 to a certain extent, and will mix with the air in the compression end to a certain extent, the confinement of the gaseous fuel to the space or pocket increasing in degree as low engine capacity is approached, and the mixing of the gaseous fuel with the air increasing in degree as full engine capacity is approached. The arrangement is such that, under all working conditions in a cylinder, there will be an explosive mixture confined to a segregated area in the cylinder (adjacent the ignition means 29). The engine design is such that this segregated explosive mixture will be proportioned, under all working conditions in the engine, to produce proper flame propagation in a cylinder for each explosion therein.

Upon the compression stroke, the exhaust valve 9′ remaining closed, the cam 12 having already passed by the valve-rod and valve 9 been closed by its spring 15, and the valve 20 being likewise closed by its spring, the contents of the cylinder will be compressed within the chamber 8, and the contents of the space, chamber, or pocket 19 will likewise be compressed by the pressure imparted by the fluid (air or air mixed with gaseous fuel) compressed in said chamber 8. The fuel mixture within the space, chamber, or pocket 19 will be ignited in the usual manner by means of the spark plug 29, at a less or greater internal before the piston has attained the end of its up-stroke upon said ignition, the resultant combustion of the fuel-mixture within the space, chamber, or pocket 19 will produce both heat and expansive action, which later will vent itself into chamber 8, while the attendant heat will be imparted along with it (and also through the adjacent walls of the structure) to the body of the compressed fluid within chamber 8; and these two added factors will expand the contents of chamber 8 and cause the piston to descend in its power stroke. Clearly, when the engine is working at its lowest capacity and practically all of the gaseous fuel is confined to the space, chamber, or pocket 19, the venting from the space, chamber, or pocket to the chamber 8 will impart heat and expansive action to practically pure air in said chamber 8; when the engine is working at full capacity, the venting will impart heat and expansive action to a mixture in said chamber 8 which is practically of the quality of the explosive mixture in the space, chamber, or pocket 19 that produced the explosion, and there will be a burning through the whole area of the compression-end and the space, chamber, or pocket; and when the engine is working at less than full capacity and greater than lowest capacity, the venting will be to a mixture in said chamber 8 consisting of air impregnated with gaseous fuel to an extent depending upon the capacity at which the engine is working. That is, as the engine capacity approaches full capacity, the gaseous fuel in the chamber 8 increases in degree, and as the engine capacity approaches lowest capacity, the gaseous fuel in said chamber 8 decreased in degree. At any event, due mainly to the enormous amount of heat imparted to the chamber 8 from the space, chamber, or pocket 19, there will be, during each work stroke of the piston, a complete and clean burning of all of the gaseous fuel in the chamber 8, with the attendant advantageous heat and expansive action desired. It will be evident, that when the gaseous fuel valve and the air valve are simultaneously opened, there will be simultaneous admission of gaseous fuel and air to the cylinder, and, consequently, a thorough intermingling of said gaseous fuel and air. But, the instant the gaseous fuel valve is retarded, the main turbulence in the cylinder will be confined to the portion of air which is first to enter the cylinder. The gaseous fuel is subjected to turbulence to a smaller and smaller degree as its admission is retarded. So that, under all conditions except when the engine is working at full capacity, there will be small tendency in a cylinder to cause gaseous fuel entering via the space, chamber, or pocket 19 to become commingled with the air in the chamber 8. That is to say, the general tendency in the engine will be for the gaseous fuel which finds its way from the space 19 to the chamber 8 to become mixed with only portions of the air in said chamber 8 adjacent the space 19, (it being remembered that the time elapsing between the suction stroke and the power stroke is quite short), with the result that the chamber 8 will, in effect, contain for each explosion in the cylinder a portion of practically pure air, and a portion of air saturated with gaseous fuel, which latter portion will be contiguous with the space 19 and will be an amount increasing in direct relation to the engine capacity—thus producing additional heat and expansive action in direct ratio to the power to be generated.

Following the power stroke, the exhaust valve 9′ is lifted by its cam to permit the exhaust stroke of the piston.

It will be observed that not only does the present invention economize in fuel, but in addition it reduces carbon-deposit, by reason in the first instance of the intense heat generated within the ignition space, chamber, or pocket, and in the second instance by reason of the scavenging by the excess of atmospheric air within the main compression chamber and cylinder.

Owing to the free intake of air through the relatively large valve 9, there will be capable of being present a sufficient amount of air to provide, together with the gaseous fuel admitted, a constant pressure in said cylinder under all working conditions of the engine, whether running at full capacity or at less than full capacity.

The gaseous fuel to be utilized in the present engine is desirably quite rich, probably too rich to alone provide an explosive mixture. It is the commingling of the gaseous fuel with air in the space 19 which provides an explosive mixture. The air inlet valve of fixed capacity and the gaseous fuel valve of adjustable capacity not only insures a constant pressure in a cylinder for any working condition in an engine, but also insures that there can be present in the space, chamber, or pocket 19, an explosive mixture, under widely varying working conditions in said engine. Were the arrangement reversed (gaseous fuel valve of fixed capacity and air inlet valve of adjustable capacity), this could not be so. In such a case, the engine would have to run at full capacity with air inlet valve supplying little or no air, and at minimum capacity with air inlet valve supplying a maximum amount of air. Consequently, the gaseous fuel would have to provide "an explosive mixture" when commingled with little or no air (as when engine working at full capacity), as well as when commingled with a maximum amount of air (as when engine working at minimum capacity). Such a result could hardly be obtained, and the reversed arrangement would probably not function under the varying working conditions of an automotive vehicle engine. When the engine of the invention is working at full capacity, there is present in a cylinder a large quantity of air to commingle with a charge of gaseous fuel and to provide with said fuel an explosive mixture. As a consequence, the gaseous fuel utilized can be very rich, and as the fuel feed decreases (engine working at less than full capacity), the thinning out of the gaseous fuel (the making lean of the explosive mixture), occurs very gradually, especially in an engine designed after the fashion hereinbefore fully set forth and having a combustion space, chamber, or pocket the equivalent of the space 19. That is to say, while an arrangement of air inlet valve and gaseous fuel inlet valve as shown and described will function to make an internal combustion engine capable of meeting all of the conditions imposed upon it in automotive vehicle use, an engine with a reversed arrangement of air inlet valve and gaseous fuel inlet valve could not function to meet all of said conditions.

The invention having been thus fully described, what is claimed is:

1. An internal combustion engine, comprising a cylinder affording a compression end and provided with a valve controlled exhaust outlet, a piston reciprocatable within said cylinder, an air inlet valve leading to said compression end and adapted to be maintained at fixed capacity, which capacity is adapted to freely supply said cylinder with a sufficient charge of air for any explosion therein regardless of the capacity at which the engine is working, a gaseous fuel inlet valve leading to said cylinder, and means for timing said gaseous fuel inlet valve relative to said air inlet valve whereby the operation of said valves can preferably be simultaneous when the engine is working at full capacity, or the operation of said gaseous fuel inlet valve can be retarded relative to the operation of said air inlet valve when the engine is working at less than full capacity.

2. An internal combustion engine, comprising a cylinder affording a compression end and provided with a valve controlled exhaust outlet, a piston reciprocatable within said cylinder, an ignition space provided with suitable ignition means and having a valve controlled inlet for admitting gaseous fuel, a valve controlled air inlet leading into said compression end, there being communication between said ignition space and said compression end, and said valve controlled air inlet having fixed capacity relatively great with respect to the capacity of said compression end, means whereby the intake of air to said compression end and the intake of gaseous fuel to said space can preferably be simultaneous, or the intake of gaseous fuel can be retarded with respect to the intake of air, and means for obtaining an explosive mixture in said ignition space both when said air and gaseous fuel intakes are simultaneous and when the gaseous fuel intake is retarded with respect to the air intake.

3. An internal combustion engine, comprising a cylinder affording a compression end and provided with a valve controlled exhaust outlet, a piston reciprocatable within said cylinder, an ignition space provided with suitable ignition means and having a valve controlled inlet for admitting gaseous fuel, a valve controlled air inlet leading into said compression end, there being communication between said ignition space and said compression end, and said valve controlled air inlet having capacity capable of freely supplying a cylinder with air during any suction stroke of a piston in said cylinder regardless of the working condition of the engine, means whereby the intakes of gaseous fuel and air can preferably be simultaneous when the engine is to work at full capacity to provide an explosive mixture throughout said compression end and said space, and means for retarding the intake of gaseous fuel with respect to the intake of air when the engine is to work at lowered capacity, in such manner that the gaseous fuel supplied to the ignition space will be in direct ratio to the power to be generated in the cylinder.

4. An internal combustion engine, comprising a cylinder affording a compression end and provided with a valve controlled exhaust outlet, a piston reciprocatable within said cylinder, an ignition space provided with suitable ignition means and having a valve controlled inlet for admitting gaseous fuel, a valve controlled air inlet leading into said compression end, there being communication between said ignition space and said compression end, and said valve controlled air inlet having fixed capacity, means whereby the intakes of gaseous fuel and air can be simultaneous to provide a homogeneous explosive mixture throughout said compression end and said space when the engine is working at full capacity, and means for retarding the intake of gaseous fuel with respect to the intake of air in direct ratio to the reduction of the power to be generated, to provide an explosive mixture in said ignition space regardless of the character of the fluid in said compression end.

5. An internal combustion engine, comprising a cylinder affording a compression end and provided with a valve controlled exhaust outlet, a piston reciprocatable within said cylinder, an ignition space provided with suitable ignition means and having a valve controlled inlet for admitting gaseous fuel, a valve controlled air inlet leading into said compression end, there being communication between said ignition space and said compression end, and said valve controlled air inlet having fixed capacity capable of freely supplying a cylinder with air during any suction stroke of a piston in said cylinder, and means whereby the intakes of gaseous fuel and air to said space and compression end, respectively, can be simultaneous when the engine is working at full capacity and the intake of gaseous fuel can be retarded with respect to the intake of air when the engine is working at lowered capacity, the means including an arrangement for retarding the intake of gaseous fuel in direct ratio to the power to be generated.

6. An internal combustion engine, comprising a cylinder affording a compression end and provided with a valve controlled exhaust outlet, a piston reciprocatable within said cylinder, an ignition space provided with suitable ignition means and having a valve controlled inlet for admitting fuel mixture, a valve controlled air inlet leading into said compression end, there being communication between said ignition space and said compression end, and said valve controlled air inlet having fixed capacity capable of freely supplying a cylinder with air during any suction stroke of a piston in said cylinder, and means for timing at will with respect to intakes of air to said compression end the occurrence and duration of the intakes of fuel mixture to said ignition space, whereby when the engine is working at full capacity the occurrence of intakes of fuel mixture and air can be simultaneous, and when the engine is working at lowered capacity, the occurrence of the intakes of fuel mixture can be retarded with respect to the occurrence of the intakes of air.

7. An internal combustion engine, comprising a cylinder affording a compression end and provided with a valve controlled exhaust outlet, a piston reciprocatable within said cylinder, a separate ignition pocket provided with suitable ignition means and having a valve controlled inlet for admitting fuel mixture, a valve controlled cold air inlet leading into one side of said compression end, and a restricted port leading from said pocket into said compression end at the side diametrically opposite to said cold air inlet.

8. An internal combustion engine, comprising a cylinder affording a compression end and provided with a valve controlled exhaust outlet, a piston reciprocatable within said cylinder, a separate ignition pocket provided with suitable ignition means and having a valve controlled inlet for admitting fuel mixture, a valve controlled cold air inlet leading into one side of said compression end, a restricted port leading from said pocket into said compression end at the side diametrically opposite to said cold-air inlet, and means for timing the occurrence and duration of the admissions of fuel mixture with respect to the intakes of cold air.

9. An internal combustion engine, comprising a cylinder having a valve controlled cold air inlet and a valve controlled exhaust outlet, a piston reciprocatable within said cylinder, a separate ignition pocket provided with suitable ignition means and having a valve controlled inlet for admitting fuel mixture, a restricted port leading from said pocket into the compression-end of said cylinder at a point diametrically opposite to said cold air inlet, means for maintaining uniform and uniformly spaced intakes of cold air alternately with regularly occurring exhaust, and means for timing at will with respect to said intakes of cold air the occurrence and duration of the intakes of fuel mixture.

Signed at Bridgeport, in the county of Fairfield, and State of Connecticut, this 10th day of October, 1925.

ANDREW L. RIKER.